United States Patent
Cheng et al.

(10) Patent No.: US 10,752,354 B2
(45) Date of Patent: Aug. 25, 2020

(54) REMOTE CONTROL FOR IMPLEMENTING IMAGE PROCESSING, UNMANNED AIRCRAFT SYSTEM AND IMAGE PROCESSING METHOD FOR UNMANNED AERIAL VEHICLE

(71) Applicant: AUTEL ROBOTICS CO., LTD., Shenzhen, Guangdong (CN)

(72) Inventors: Changnan Cheng, Guangdong (CN); Qinhui Gui, Guangdong (CN); Qingxiong Lai, Guangdong (CN); Huihua Zhang, Guangdong (CN); Yintao Huang, Guangdong (CN); Shuai Wang, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 224 days.

(21) Appl. No.: 15/886,157

(22) Filed: Feb. 1, 2018

(65) Prior Publication Data
US 2018/0339774 A1 Nov. 29, 2018

Related U.S. Application Data (63) Continuation of application No. PCT/CN2017/114455, filed on Dec. 4, 2017.

(30) Foreign Application Priority Data

May 23, 2017 (CN) .................... 2017 2 0583947 U (51) Int. Cl.
B64C 39/02 (2006.01)
H04N 7/18 (2006.01)
(Continued)

(52) U.S. Cl.
CPC ......... *B64C 39/024* (2013.01); *G05D 1/0016* (2013.01); *G05D 1/101* (2013.01);
(Continued)

(58) Field of Classification Search
CPC ........... B64C 39/024; B64C 2201/127; G05D 1/0016; G05D 1/101; G06F 3/0412; G06F 3/0416; H04N 7/185
See application file for complete search history.

(56) References Cited

U.S. PATENT DOCUMENTS

2006/0102798 A1 5/2006 Cox et al.
2007/0093945 A1* 4/2007 Grzywna ............... G05D 1/101
701/23

(Continued)

FOREIGN PATENT DOCUMENTS

CN 104950771 A 9/2015
CN 105425952 A 3/2016
(Continued)

OTHER PUBLICATIONS

Android 2.3.4 User's Guide, published May 20, 2011, all pages are relevant in particular pp. 1-10, 19-20, 27-29, 47-48, retreived from https://static.googleusercontent.com/media/www.google.com/en//help/hc/pdfs/mobile/AndroidUsersGuide-2.3.4.pdf (Year: 2011).*

(Continued)

*Primary Examiner* — Calvin Cheung (57) ABSTRACT

The present application discloses a remote control for implementing image processing, including a remote control controller, an image transmission unit and a data transmission unit, and further including: a system processor, connected to the remote control controller and the image transmission unit to process an image transmitted by the image transmission unit; and a display unit, connected to the system processor to display or edit the image processed by the
(Continued)

system processor, where the remote control controller exchanges system data with the system processor, to implement function operations of the remote control, and the image transmission unit sends image data obtained from an unmanned aerial vehicle to the system processor, to display or edit the image data on the display unit connected to the system processor. The remote control completes real-time display or editing of aerial videos while operating an aerial vehicle, thereby greatly improving user's operation experience and convenience.

16 Claims, 6 Drawing Sheets

(51) Int. Cl.
　　　G05D 1/00　　(2006.01)
　　　G05D 1/10　　(2006.01)
　　　G06F 3/041　　(2006.01)
(52) U.S. Cl.
　　　CPC .......... *G06F 3/0412* (2013.01); *G06F 3/0416* (2013.01); *H04N 7/185* (2013.01); *B64C 2201/127* (2013.01)

(56) References Cited

U.S. PATENT DOCUMENTS

| | | | | |
|---|---|---|---|---|
| 2010/0292868 | A1* | 11/2010 | Rotem | G05D 1/0038 701/2 |
| 2012/0022719 | A1* | 1/2012 | Matos | B64C 39/024 701/2 |
| 2016/0307447 | A1* | 10/2016 | Johnson | B60L 58/12 |
| 2016/0364004 | A1* | 12/2016 | Ekandem | G06F 3/017 |
| 2017/0134699 | A1* | 5/2017 | Kim | H04N 7/183 |
| 2017/0220036 | A1* | 8/2017 | Visser | G05D 1/0808 |
| 2017/0336203 | A1* | 11/2017 | Barnes | G01S 17/88 |
| 2018/0109767 | A1* | 4/2018 | Li | H04N 5/23206 |
| 2018/0134385 | A1* | 5/2018 | Lee | A63H 30/04 |
| 2018/0136642 | A1* | 5/2018 | Tian | G05D 1/0808 |
| 2018/0143432 | A1* | 5/2018 | Li | G02B 27/0093 |
| 2018/0155057 | A1* | 6/2018 | Irish | H04L 67/12 |
| 2018/0162527 | A1* | 6/2018 | Hupp | B64D 7/04 |
| 2018/0262674 | A1* | 9/2018 | Iwakura | B64D 17/00 |
| 2019/0023395 | A1* | 1/2019 | Lee | B64C 39/024 |
| 2019/0132711 | A1* | 5/2019 | Zhang | H04W 4/21 |
| 2019/0259353 | A1* | 8/2019 | Yang | H04N 5/23245 |

FOREIGN PATENT DOCUMENTS

| | | |
|---|---|---|
| CN | 105519094 A | 4/2016 |
| CN | 205179207 U | 4/2016 |
| CN | 106165388 A | 11/2016 |
| WO | 2017/004311 A1 | 1/2017 |

OTHER PUBLICATIONS

International Search Report dated Jan. 31, 2018, PCT/CN2017/114455 English Translation Is Not Yet Available on WPO.
Supplementary European Search Report dated Sep. 7, 2018; EP17825094.

* cited by examiner

REMOTE CONTROL FOR IMPLEMENTING IMAGE PROCESSING, UNMANNED AIRCRAFT SYSTEM AND IMAGE PROCESSING METHOD FOR UNMANNED AERIAL VEHICLE

CROSS-REFERENCE

This application is a continuation application of International Application No. PCT/CN2017/114455, filed on Dec. 4, 2017, which claims priority of Chinese Patent Application No. 201720583947.9, filed on May 23, 2017, both of which are incorporated herein by reference in its entirety.

TECHNICAL FIELD

The present application relates to the field of unmanned aerial vehicles, and in particular, to a remote control for implementing image processing, an unmanned aircraft system using the remote control and an image processing method for an unmanned aerial vehicle.

RELATED ART

With the development of wireless communications technologies, wireless local area networks and image processing technologies, the image processing function of unmanned aerial vehicles are becoming increasingly formidable. More and more users began to choose unmanned aerial vehicles that can perform high definition photography or panoramic photography.

An existing unmanned aircraft system includes an aerial vehicle and an unmanned aerial vehicle remote control in wireless communication with the aerial vehicle. Generally, the remote control operates the unmanned aerial vehicle and receives signals, images and videos from the unmanned aerial vehicle. When a user needs to view or edit an image or a video that is captured by the unmanned aerial vehicle, the remote control needs to be connected to a mobile terminal having a display function (for example, a mobile phone or a tablet computer). The mobile terminal further needs to be installed with a corresponding application program, so that the user can view and edit the image or the video that are captured by the unmanned aerial vehicle. Such an unmanned aircraft system leads to complexity and inconvenience for the user to browse video data sent by the aerial vehicle, affecting the user experience. Moreover, defects such as video quality and video reliability are also caused due to transmission of the image or the video from the remote control to the mobile terminal.

SUMMARY

In view of this, the present application provides a remote control for implementing image processing, an unmanned aircraft system using the remote control and an image processing method for an unmanned aerial vehicle. An image processing system is added to the remote control, so that the remote control serves as a control device of an aerial vehicle as well as a display and processing device of an aerial image, and completes real-time display or editing of an aerial video while operating the aerial vehicle, thereby greatly improving the operation experience and convenience of a user.

According to a first aspect, the present application provides a remote control for implementing image processing, including:
a remote control controller, an image transmission unit and a data transmission unit, and further including: a system processor, connected to the remote control controller and the image transmission unit, and configured to process an image transmitted by the image transmission unit; and a display unit, connected to the system processor, and configured to display or edit the image processed by the system processor, where the remote control controller exchanges system data with the system processor, to implement function operations of the remote control, and the image transmission unit sends image data obtained from an unmanned aerial vehicle to the system processor, to display or edit the image data on the display unit connected to the system processor.

The remote control further includes a power management unit, connected to the remote control controller and the system processor, and configured to supply power to the remote control controller and the system processor.

Further, the display unit includes a display screen and a touch screen.

The remote control further includes at least one of the following units, which is connected to the system processor: a wireless communications unit, an interface unit or an audio unit.

The function operations of the remote control include power-on/power-off, sleep, wake-up, power statistics collection, power warning and a battery charging prompt.

According to a second aspect, the present application provides a remote control for implementing image processing, including a remote-control control module, and further including an image processing module connected to the remote-control control module, where
the remote-control control module includes a first image transmission interaction module and the image processing module includes a second image transmission interaction module, and wherein the first image transmission interaction module sends image data that is obtained by the remote-control control module from an unmanned aerial vehicle to the second image transmission interaction module, to display or edit the image data on a display module connected to the image processing module.

Further, the remote-control control module includes a first system interaction module and the image processing module includes a second system interaction module, wherein the first system interaction module exchanges system data with the second system interaction module, to implement function operations of the remote control.

The function operations of the remote control include power-on/power-off, sleep, wake-up, power statistics collection, power warning and a battery charging prompt.

Further, the remote control further includes a power management module, connected to the remote-control control module and the image processing module, and configured to supply power to the remote-control control module and the image processing module.

Further, the power management module includes an image processing module-starting module and an image processing module-analog control module.

Further, the image processing module adopts an Android system.

According to a third aspect, the present application provides an unmanned aircraft system, including an aerial vehicle, and further including the remote control for implementing image processing according to the first aspect of the present application, where the remote control for implementing image processing is wirelessly connected to the aerial vehicle, and wherein the remote control receives operation data and image data that are sent by the aerial vehicle, and the display unit connected to the system processor displays or edits the image data.

According to a fourth aspect, the present application provides an unmanned aircraft system, including an aerial vehicle, and further including the remote control for implementing image processing according to the second aspect, where the remote control for implementing image processing is wirelessly connected to the aerial vehicle and wherein the remote control receives operation data and image data that are sent by the aerial vehicle, and the display module connected to the image processing module displays or edits the image data.

According to a fifth aspect, the present application provides an image processing method for an unmanned aerial vehicle, including the following steps:

obtaining, by a remote-control control module, image data sent by the unmanned aerial vehicle;

sending, by the remote-control control module by using a first image transmission interaction module, the image data obtained from the unmanned aerial vehicle to a second image transmission interaction module; and displaying or editing, by a display module connected to an image processing module, the image data received by the second image transmission interaction module.

Further, the remote-control control module includes a first system interaction module, the image processing module includes a second system interaction module, and the first system interaction module exchanges system data with the second system interaction module, to implement function operations of the remote control.

A power management module centrally manages the remote-control control module and the image processing module, to supply power to the remote-control control module and the image processing module.

Further, the image processing module adopts an Android system, and wherein when started by the power management module, the image processing module runs start-up code, initializes a display screen, and starts the Android system so that the remote-control control module is in communication with the image processing module, and an unmanned aerial vehicle operation application is started.

Further, the image processing module adopts an Android system, and the power management module obtains a status of a general power button, simulates a button type of the Android system, and controls power-on/power off or sleep/wake-up of the image processing module.

According to a sixth aspect, the present application provides a computer storage medium, where the computer storage medium can store a program, and the program performs the method according to the fifth aspect of the present application.

A beneficial effect of the implementations of the present application is: By means of the remote control for implementing image processing and the unmanned aircraft system using the remote control that are provided in the embodiments, an image processing system is added to the remote control, so that the remote control serves as a control device of an aerial vehicle as well as a display and processing device for aerial photography, and completes real-time display or editing of an aerial video while operating the aerial vehicle, thereby greatly improving the operation experience and convenience of a user.

DETAILED DESCRIPTION

To make the objectives, technical solutions, and advantages of embodiments of the present application clearer, the following further describes the embodiments of the present application in details with reference to the accompanying drawings. Herein, the schematic embodiments of the present application and descriptions thereof are merely used to explain the present application, but are not intended to limit the present application.

The technical solutions of the present application relate to a hardware architecture and a software architecture. Therefore, specific implementations are to be described from the perspectives of hardware and software.

It should be noted that a "system processor" and an "image processing module" describe an integrated image processing system respectively from the perspectives of hardware and software; a "power management unit" and a "power management module" describe power management of a remote control respectively from the perspectives of hardware and software; and a "remote control controller" and a "remote-control control module" describe a remote control docked with an unmanned aerial vehicle respectively from the perspectives of hardware and software.

Figure 1:
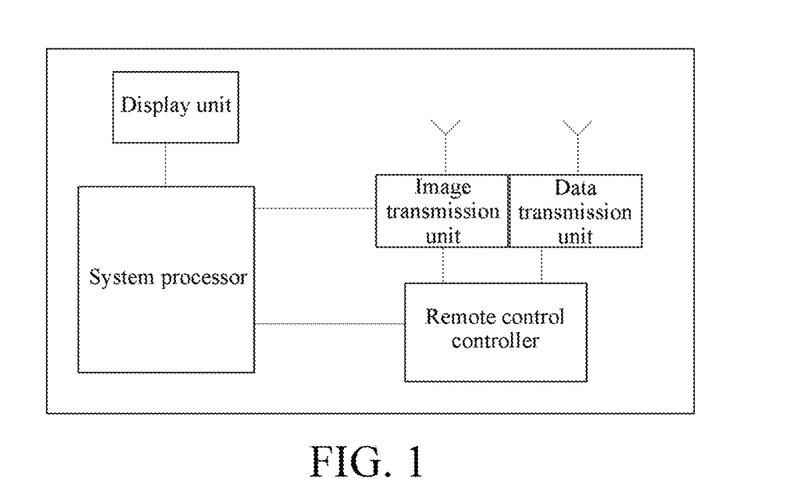
FIG. 1 is a schematic diagram of a hardware structure of a remote control for implementing image processing according to an embodiment of the present application.

Referring to FIG. 1, FIG. 1 is a schematic diagram of a hardware structure of a remote control according to an embodiment of the present application.

The remote control includes a remote control controller, an image transmission unit and a data transmission unit, and further includes: a system processor, connected to the remote control controller and the image transmission unit, and configured to process an image transmitted by the image transmission unit; and a display unit, connected to the system processor, and configured to display or edit the image processed by the system processor.

The remote control controller exchanges system data with the system processor, to implement function operations of the remote control, and the image transmission unit sends image data obtained from an unmanned aerial vehicle to the system processor, to display or edit the image data on the display unit connected to the system processor. The data transmission unit is configured to transmit, to a flight control unit of the unmanned aerial vehicle by using an interactive peripheral device such as a Hall joystick, a flight control instruction input by the unmanned aerial vehicle.

In this embodiment, the remote control completes real-time display or editing of an aerial video while operating an aerial vehicle, thereby greatly improving the operation experience and convenience of a user.

Figure 2:
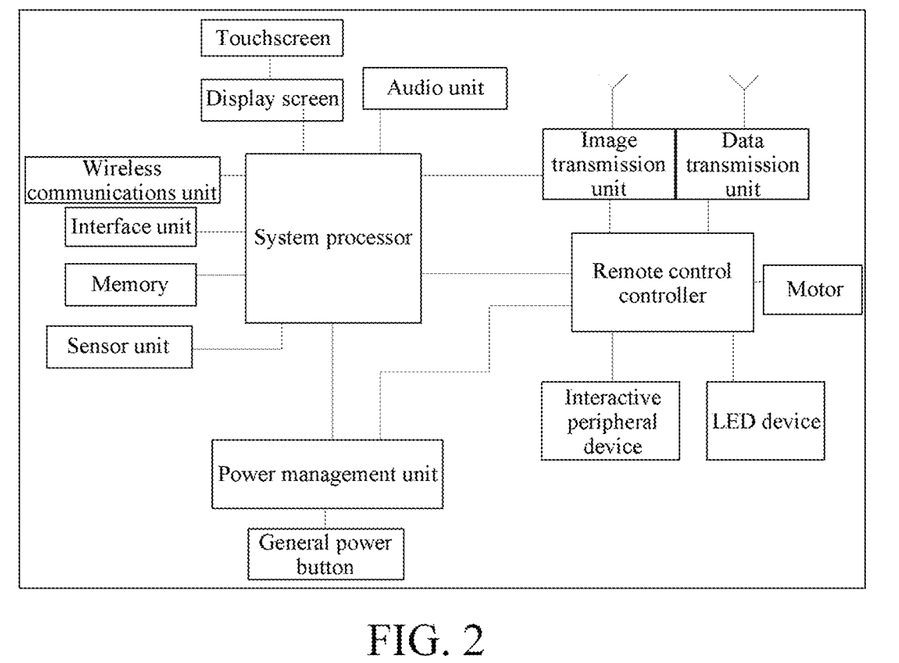
FIG. 2 is a schematic diagram of a hardware structure of a remote control for implementing image processing according to another embodiment of the present application.

Referring to FIG. 2, FIG. 2 is a schematic diagram of a hardware structure of a remote control according to another embodiment of the present application. Persons of ordinary skill in the art should understand that FIG. 2 is a schematic diagram of the hardware structure of the remote control provided in a preferred embodiment of the present application. In another embodiment of the present application, not all units shown in FIG. 2 are necessarily included, and one or more of the units shown in FIG. 2 may be included.

In this embodiment, the remote control for implementing image processing includes a remote control terminal and an image processing terminal. In an embodiment, the remote control terminal is a single-chip microcomputer, and runs on a system on a remote control microcomputer. The image processing terminal runs on an intelligence system such as an Android system. In another embodiment, the remote control terminal may be managed and controlled by the image processing terminal. The remote control terminal and the image processing terminal exchange data with each other, and together complete function operations of the remote control and display and editing of image data.

The remote control terminal includes: a remote control controller, an image transmission unit, a data transmission unit, an interactive peripheral device, an LED device and a vibration motor. The image transmission unit and the data transmission unit are both provided with an antenna in wireless communication with an aerial vehicle. The interactive peripheral device includes a Hall joystick, a scroll wheel, a button, a dual in-line package switch and the like, and is used by a user to control the remote control and an unmanned aerial vehicle.

The image processing terminal includes: a system processor, a display unit, an audio unit, a wireless communications unit, an interface unit, a memory and a sensor unit. In an optional embodiment, an embodiment of the display unit includes only a display screen. In this embodiment, the user can only view an image. In another optional embodiment, to enrich exchanges, in another embodiment, the display unit includes a display screen and a touch screen. In this embodiment, the user not only can view the image data, but also can edit an image by using the touch screen. The interface unit includes: a high definition multimedia interface (HDMI), a universal serial bus (USB) interface, a trans-flash (TF) card interface and the like. The memory includes a solid-state memory, and may further include a TF card. The wireless communications unit may be a wireless fidelity (WiFi) unit or may be a Bluetooth unit.

The remote control further includes a power management unit, connected to the remote control controller and the system processor, and configured to supply power to the remote control controller and the system processor. The power management unit centrally manages and controls power supply for the remote control terminal and the image processing terminal. For example, the power management unit manages control of a power output and adjustment of a voltage value.

The system processor is connected to the display unit. The remote control controller exchanges system data with the system processor, to implement the function operations of the remote control. The image transmission unit sends the image data obtained from the unmanned aerial vehicle to the system processor, to display or edit the image data on the display unit connected to the system processor. The data transmission unit is configured to transmit, to a flight control unit of the unmanned aerial vehicle by using an interactive peripheral device such as a Hall joystick, a flight control instruction input by the unmanned aerial vehicle.

The function operations of the remote control include power-on/power-off, sleep, wake-up, power statistics collection, power warning and a battery charging prompt. In terms of hardware, the remote control includes components of power-on/power-off, sleep, wake-up, power statistics collection, power warning and a battery charging prompt.

The image transmission unit of the remote control transmits video data from an aerial vehicle to an integrated system processor. The system processor completes decoding of an aerial video and image of the aerial vehicle. The system processor drives the display unit to display a decoded video or image. The image transmission unit and the system processor are integrated on a same board, so that the connection reliability is improved, and the quality and the reliability of the video are greatly improved due to advantages such as a short transmission distance between the video and image data and the connection reliability. The TF card interface and a large-capacity memory on the board can also store more aerial videos. An operator operates, by using the touch screen, an installed application program running on the system processor, to transmit setting information and control information to the system processor. The system processor backhauls the setting information and the control information to an image transmission module or the remote control controller, so as to control flight of the aerial vehicle and a device on the aerial vehicle.

In the remote control for implementing image processing in this embodiment, the image processing terminal and a high definition display device are integrated into the remote control, so that the remote control not only serves as a control device of the aerial vehicle but also serves as a display device of aerial image data obtained by the aerial vehicle. The remote control completes real-time display or editing of an aerial video while operating the aerial vehicle, thereby greatly improving the operation experience and convenience of the user.

An example in which the image processing terminal adopts an Android system is used for description below. It may be understood that the image processing terminal may alternatively adopt a Windows Mobile system, a Symbian system or a Blackberry system.

Figure 3:
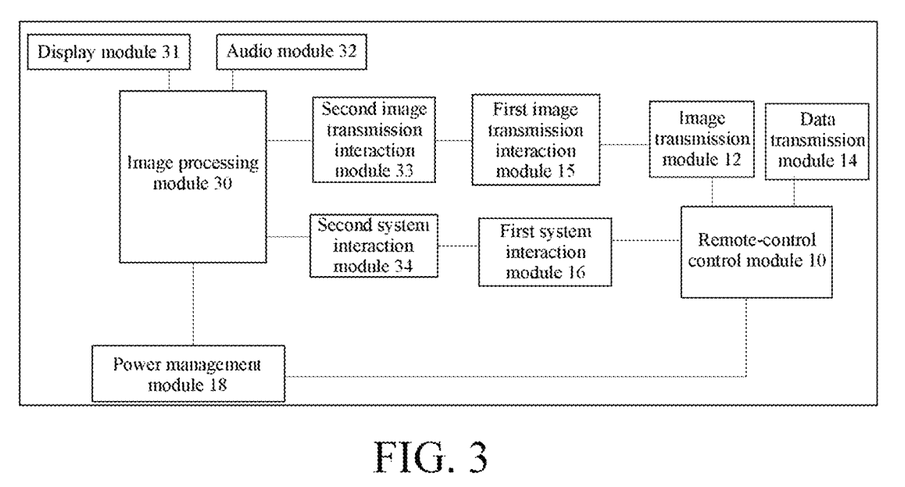
FIG. 3 is a diagram of software modules of a remote control for implementing image processing according to an embodiment of the present application.
Figure 4:
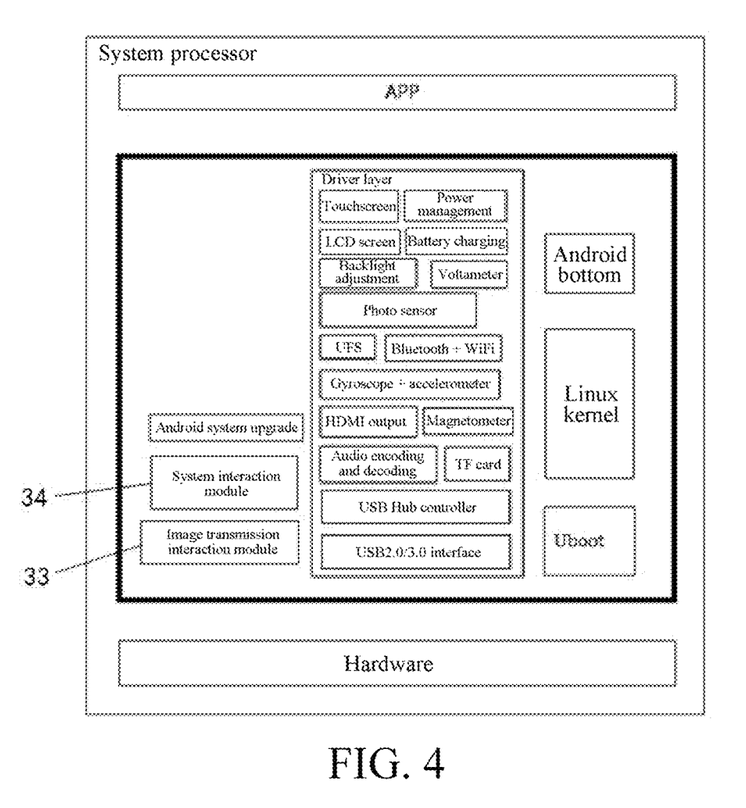
FIG. 4 is a diagram of a software architecture of an image processing module of a remote control for implementing image processing according to an embodiment of the present application.
Figure 5:
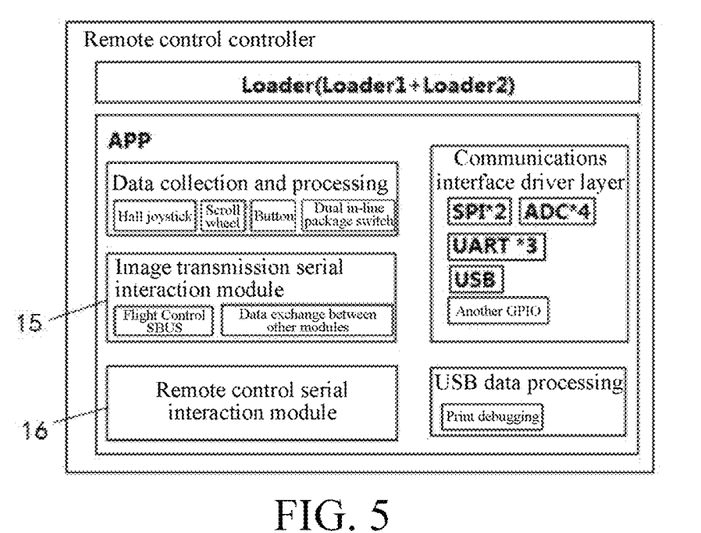
FIG. 5 is a diagram of a software architecture of a remote-control control module of a remote control for implementing image processing according to an embodiment of the present application.

Referring to FIG. 3 to FIG. 5, FIG. 3 to FIG. 5 show a software architecture of a remote control according to an embodiment of the present application.

The remote control, analyzed from the perspective of software, includes two parts: an Android system that runs on a system processor and an unmanned aerial vehicle control program that drives and runs on a remote control controller, that is, includes a remote-control control module 10 and an image processing module 30. The image processing module 30 mainly runs an application program, for example, operation on the aerial vehicle, an aerial video display graphic interface and an image editing application. The remote-control control module 10 adds, to a remote control program, a power management module, a peripheral driver and an interaction module that exchanges data with the image processing module 30.

FIG. 3 is a block diagram of a software architecture of a remote control for implementing image processing. Software modules of the remote control include the remote-control control module 10 and the image processing module 30. The remote-control control module 10 is connected to the image processing module 30.

The remote-control control module 10 includes a first image transmission interaction module 15. The image processing module 30 includes a corresponding second image transmission interaction module 33. The first image transmission interaction module 15 sends image data that is obtained by the remote-control control module 10 from an unmanned aerial vehicle to the second image transmission interaction module 33, to display or edit the image data on a display module 31 connected to the image processing module 30. In addition, the remote-control control module 10 includes a first system interaction module 16. The image processing module 30 includes a second system interaction module 34. The first system interaction module 16 exchanges system data with the second system interaction module 34, to implement function operations of the remote control.

The remote-control control module 10 further includes an image transmission module 12 and a data transmission module 14. The image processing module 30 further includes the display module 31 and an audio module 32.

The software modules of the remote control further include a power management module, connected to the remote-control control module 10 and the image processing module 30, and configured to supply power to the remote-control control module 10 and the image processing module 30. The power management module includes an image processing module-starting module and an image processing module-analog control module.

The function operations of the remote control include power-on/power-off, sleep, wake-up, power statistics collection, power warning and a battery charging prompt. In terms of hardware, the remote control includes components of power-on/power-off, sleep, wake-up, power statistics collection, power warning and a battery charging prompt.

To implement the function operations of the remote control, the system data exchanged between the first system interaction module 16 and the second system interaction module 34 includes sleep information, wake-up information, power statistics collection information, power warning information and battery charging prompt information.

The system data exchanged between the remote-control control module 10 and the image processing module 30 is described as follows:

from the image processing module 30 to the remote-control control module 10: a status of an Android system (for example, sleep and wake-up information, power and a battery charging status); and from the remote-control control module 10 to the image processing module 30: commands such as sleep and power-off.

An unmanned aircraft system is usually used outdoors. Therefore, to save electricity, the image processing module 30 is adjusted to a sleep state when not working. There are two trigger sources for sleep: a Linux kernel program of an Android system of the image processing module 30 and a general power button disposed on the remote control. After an operation on the general power button is detected by the power management module, the power management module simulates a detected power button signal into Android sleep information for the image processing module 30 by using an analog control module, so that the image processing module sleeps.

In addition, the image processing module 30 also needs to send the sleep information and the wake-up information to the remote-control control module 10. In this embodiment, the sleep information and the wake-up information mainly refer to the time points at which the Android system enters sleep and is woken up. In this way, the power management module in the remote-control control module 10 may manage the image processing module 30 in real time.

Voltmeter information of the image processing module 30 needs to be sent to the remote-control control module 10, so as to implement low-power warning on a buzzer of remote control hardware. In addition, when the battery of the image processing module 30 is charged, the battery charging information needs to be sent to the remote-control control module 10, because except that a charging status is presented on a display interface of the image processing module 30, an indication light of the remote control hardware needs to flicker to give a prompt, and the remote-control control module 10 needs to be notified.

A starting module of the power management module is configured to simulate Android power-on/power-off information from the remote-control control module 10, so as to power on or power off the image processing module 30. Alternatively, the image processing module 30 makes a judgment by itself and completes a power-on/power-off operation.

The power-on/power-off operation is completed.

FIG. 4 is a diagram of a software architecture of the image processing module 30. The black blocks show bottom implementation of Android system platform software, which includes systems based on uboot, Linux kernel and Android and drivers of various peripheral modules.

FIG. 5 is a diagram of a software architecture of the remote-control control module 10. The software architecture includes a system based on Loader and App and drivers of various peripheral modules.

In the present application, a system processor is added to an unmanned aerial vehicle remote control to run an Android operating system, so as to display and process an aerial video, so that a user may locally browse, download and edit a video and an image, thereby greatly improving the user experience. In addition, by means of the present application, a remote control structure is simplified, so that an overall structure of an unmanned aircraft system is simpler, and moreover, the display effect of an aerial video and the operation experience of the remote control are more desirable.

Figure 6:
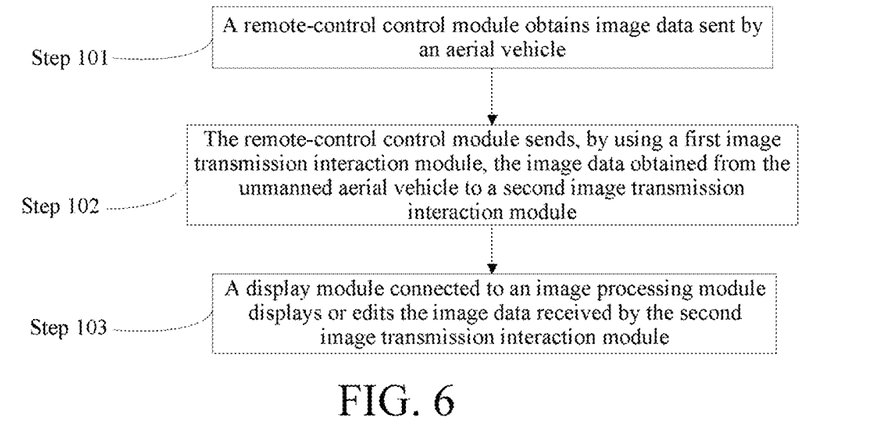
FIG. 6 is a flowchart of an image processing method for an unmanned aerial vehicle according to an embodiment of the present application.

Referring to FIG. 6, FIG. 6 shows an image processing method for an unmanned aerial vehicle according to an embodiment of the present application. The image processing method for an unmanned aerial vehicle includes the following steps.

A remote-control control module is provided with a first image transmission interaction module. An image processing module is provided with a second image transmission interaction module. The first image transmission interaction module is connected to the second image transmission interaction module.

Step 101: The remote-control control module obtains image data sent by an aerial vehicle.

Step 102: The remote-control control module sends, by using the first image transmission interaction module, the image data obtained from the unmanned aerial vehicle to the second image transmission interaction module.

Step 103: A display module connected to the image processing module displays or edits the image data received by the second image transmission interaction module.

To provide a remote control better satisfying a use need of a user, the remote-control control module includes a first system interaction module, the image processing module includes a second system interaction module, and the first system interaction module exchanges system data with the second system interaction module, to implement function operations of the remote control.

A power management module centrally manages the remote-control control module and the image processing module, to supply power to a remote control controller and a system processor. For example, the power management unit manages control of a power output and adjustment of a voltage value.

In this embodiment, the image processing module adopts an Android system. When started by the power management module, the image processing module runs start-up code, initializes a display screen, and starts the Android system, the remote-control control module is in communication with the image processing module, and an unmanned aerial vehicle operation application is started.

In this embodiment, the power management module obtains a status of a general power button, simulates a button type of the Android system, and controls power-on/power off or sleep/wake-up of the image processing module.

Figure 7:
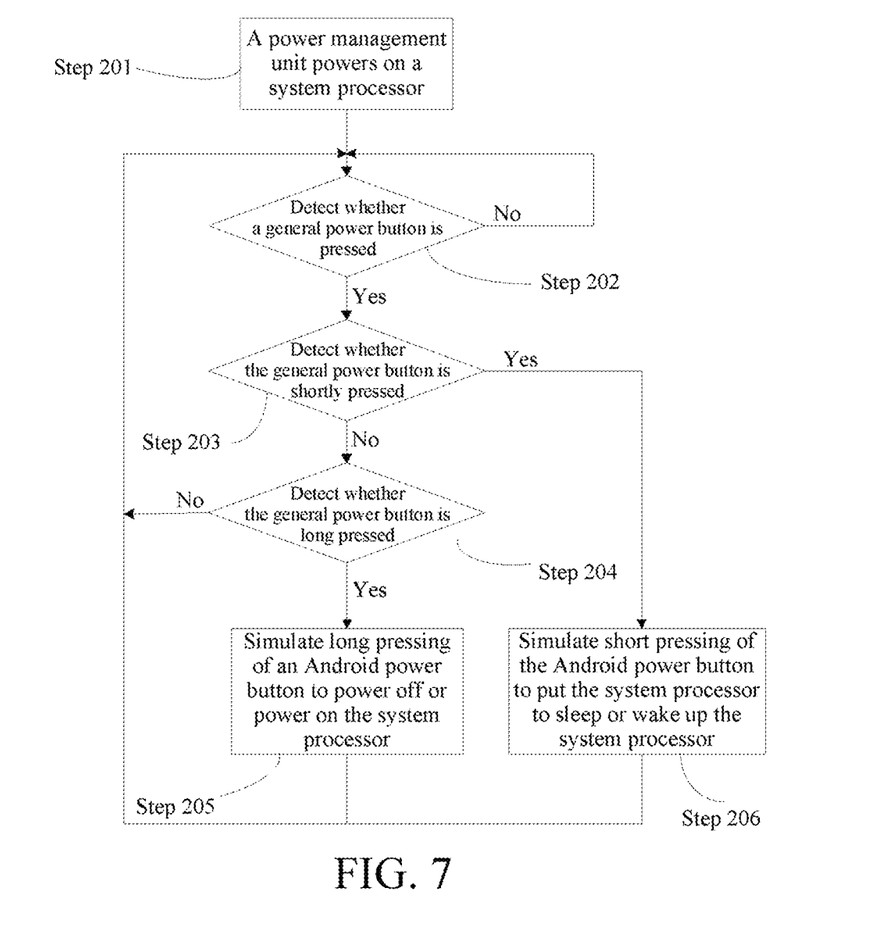
FIG. 7 is a flowchart of analog control of a power management module in an image processing method for an unmanned aerial vehicle according to an embodiment of the present application.

Referring to FIG. 7, FIG. 7 is a flowchart of analog control of a power management module in an image processing method for an unmanned aerial vehicle according to an embodiment of the present application.

Step 201: A power management unit powers on a system processor.

Step 202: Detect whether a general power button is pressed; and if no general power button signal is detected, continue the detection; or if a general power button signal is detected, go to a next step.

Step 203: Detect whether the general power button is shortly pressed; and if the general power button is shortly pressed, go to step 206, and simulate short pressing of an Android power button to put the system processor to sleep or wake up the system processor; or if the general power button is not shortly pressed, go to a next step.

Step 204: Detect whether the general power button is long pressed; and if the general power button is long pressed, go to step 205, and simulate long pressing of the Android power button to power off or power on the system processor.

After step 205 and step 206 are ended, step 202 is performed to continue to detect whether the general power button is pressed.

Figure 8:
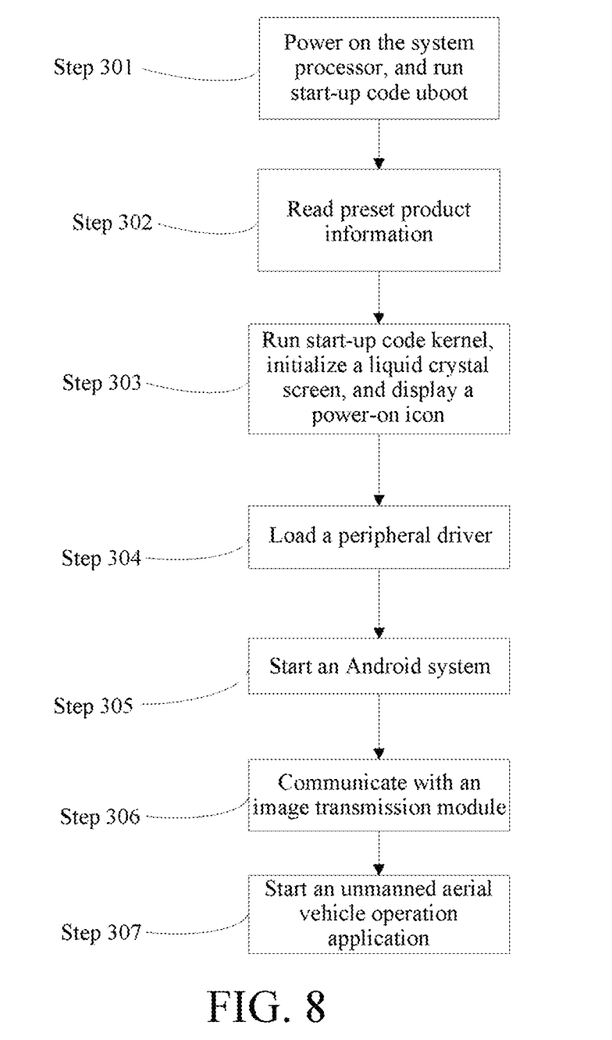
FIG. 8 is a flowchart of starting of an image processing module of an image processing method for an unmanned aerial vehicle according to an embodiment of the present application.

Referring to FIG. 8, FIG. 8 is a flowchart of starting of an image processing module of an image processing method for an unmanned aerial vehicle. When a power management module simulates Android power-on information of the image processing module, the following steps are performed.

Step 301: Power on the system processor, and run start-up code uboot.

Step 302: Read preset product information.

Step 303: Run start-up code kernel, initialize a display screen, and display a power-on icon.

Step 304: Load a peripheral driver.

Step 305: Start an Android system.

Step 306: Communicate with an image transmission module of a remote-control control module.

Step 307: Start an unmanned aerial vehicle operation application.

A remote control for implementing image processing in this embodiment of the present application is another image processing system integrated in a remote control device. The display screen and a touch screen may be driven by using the image processing system. An aerial video shot by an aerial vehicle is processed and displayed in real time while an operation on the aerial vehicle is implemented, thereby greatly improving the operation experience and image browsing convenience of a user.

Figure 9:
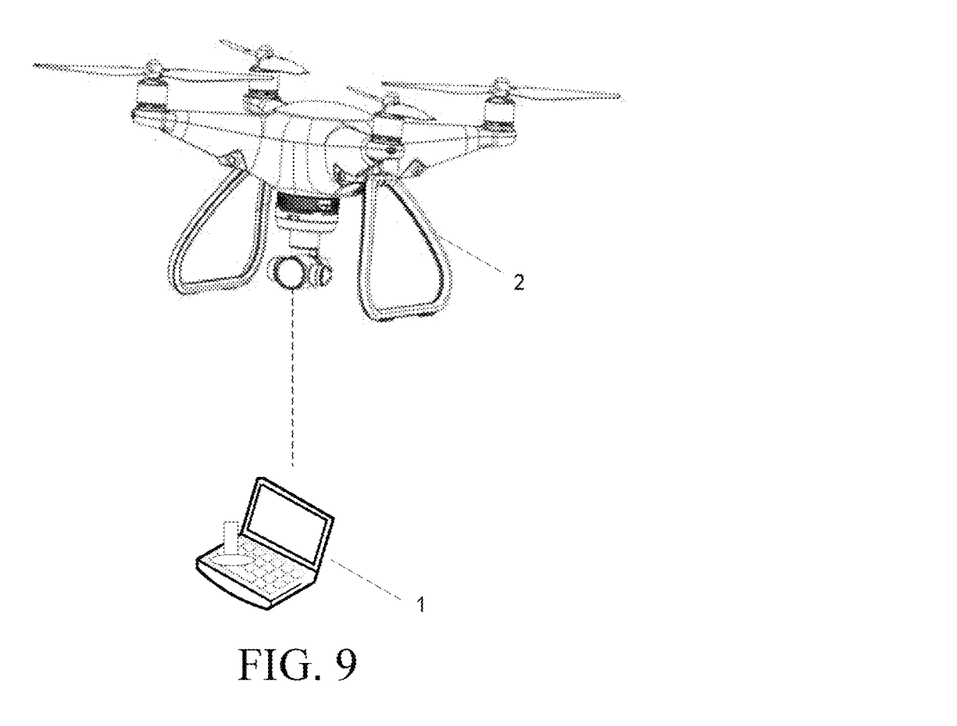
FIG. 9 is a schematic diagram of an unmanned aircraft system according to an embodiment of the present application.

Referring to FIG. 9, an embodiment provides an unmanned aircraft system, including an aerial vehicle 2, and further including the remote control 1 for implementing image processing described above. The remote control 1 for implementing image processing 1 is wirelessly connected to the aerial vehicle 2, receives operation data and image data that are sent by the aerial vehicle 2, and the display unit connected to the system processor displays or edits the image data. According to an image processing method for an unmanned aerial vehicle provided in this embodiment, the remote control completes real-time display or editing of the aerial video while operating the aerial vehicle, thereby greatly improving the operation experience and convenience of a user.

Figure 10:
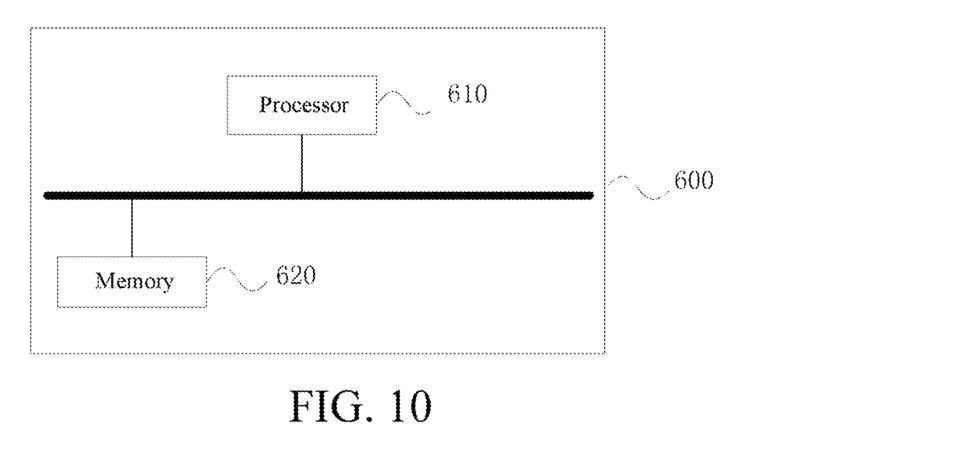
FIG. 10 is a schematic diagram of hardware of an image processing method for an unmanned aerial vehicle according to an embodiment of the present application.

An embodiment of the present application further relates to an electronic device. FIG. 10 is a schematic diagram of a hardware structure of an electronic device 600 of an image processing method for an unmanned aerial vehicle according to an embodiment of the present application. As shown in FIG. 10, the electronic device 600 includes one or more processors 610 and a memory 620. In FIG. 10, one processor 610 is used as an example.

The processor 610 and the memory 620 may be connected by using a bus or in another manner. For example, in FIG. 10, the processor 610 and the memory 620 are connected by using a bus.

The memory 620, as a non-volatile computer-readable storage medium, may be configured to store non-volatile software programs and non-volatile computer-executable programs and modules such as program instructions/modules (for example, the second image transmission interaction module 33 and the power management module 18 shown in FIG. 3) corresponding to the image processing method for an unmanned aerial vehicle in the embodiment of the present application. The processor 610 runs the non-volatile software programs, instructions and modules stored in the memory 620, to execute various functional applications and data processing of the electronic device, that is, to implement the image processing method for an unmanned aerial vehicle in the foregoing method embodiments.

The memory 620 may include a program storage area and a data storage area. The program storage area may store an operating system and an application program required by at least one function. The data storage area may store data created according to use of an apparatus for adjusting a catalog position and the like. In addition, the memory 620 may include a high-speed random access memory, and may further include a non-volatile memory such as at least one disk storage component, a flash memory, or other non-volatile solid-state storage components. In some embodiments, the memory 620 optionally includes memories disposed remote to the processor 610. The remote memories may be connected to a remote control device by using a network. Examples of the network include but are not limited to, the Internet, an intranet, a local area network, a mobile communications network, and a combination thereof.

The one or more modules are stored in the memory 620, and perform the method for adjusting a catalog position in any of the foregoing method embodiment when executed by the one or more processors 610, for example, perform step 101 to step 103 of the method in FIG. 6 described above, step 201 to step 206 of the method in FIG. 7 and step 301 to step 307 of the method in FIG. 8, and implement the functions of the modules 30 to 34 in FIG. 3 and the functions of the modules 10 to 14 in FIG. 3.

From the description of the foregoing implementations, persons skilled in the art may clearly understand that the implementations may be implemented by using software plus a universal hardware platform, and certainly, may be implemented by using hardware. Based on such an understanding, the essence of the foregoing technical solutions or contributions to the related art may be embodied in a form of a software product. The software product may be stored in a non-volatile computer-readable storage medium, and may include the procedures of the foregoing method embodiments when the program is executed. The storage medium may be a magnetic disk, an optical disc, a read-only memory (ROM) or the like.

Finally, it should be noted that the foregoing embodiments are merely used to describe the technical solutions of the present application, but are not intended to constitute any limitation. Based on the idea of the present application, the technical features in the foregoing embodiments or different embodiments may be combined, the steps may be performed in any sequence, and there are many other changes of different aspects of the present application described above. For simplification, the changes are not mentioned in the details. Although the present application is described in detail with reference to the foregoing embodiments, persons of ordinary skill in the art should understand that they may still modify the technical solutions recorded in the foregoing embodiments, or make equivalent replacements to some technical features. The modifications or replacements do not make the corresponding technical solutions essentially depart from the scope of the technical solutions of the embodiments of the present application.

What is claimed is:

1. A remote control for implementing image processing, comprising a remote control controller, an image transmission unit and a data transmission unit, and further comprising:
    a system processor, connected to the remote control controller and the image transmission unit, and configured to process an image transmitted by the image transmission unit; and
    a display unit, connected to the system processor, and configured to edit the image processed by the system processor, wherein
    the remote control controller exchanges system data with the system processor, to implement function operations of the remote control, and the image transmission unit sends image data obtained from an unmanned aerial vehicle to the system processor, to edit the image data on the display unit connected to the system processor.

2. The remote control for implementing image processing according to claim 1, further comprising a power management unit, connected to the remote control controller and the system processor, and configured to supply power to the remote control controller and the system processor.

3. The remote control for implementing image processing according to claim 1, wherein the display unit comprises a display screen and a touch screen.

4. The remote control for implementing image processing according to claim 1, further comprising at least one of following units, which is connected to the system processor:
    a wireless communications unit, an interface unit or an audio unit.

5. The remote control for implementing image processing according to claim 1, wherein the function operations of the remote control comprise power-on/power-off, sleep, wake-up, power statistics collection, power warning and a battery charging prompt.

6. A remote control for implementing image processing, comprising a remote-control control module, and further comprising an image processing module connected to the remote-control control module, wherein
    the remote-control control module comprises a first image transmission interaction module and the image processing module comprises a second image transmission interaction module, and wherein the first image transmission interaction module sends image data that is obtained by the remote-control control module from an unmanned aerial vehicle to the second image transmission interaction module, to display or edit the image data on a display module connected to the image processing module.

7. The remote control for implementing image processing according to claim 6, wherein the remote-control control module comprises a first system interaction module and the image processing module comprises a second system interaction module, wherein the first system interaction module exchanges system data with the second system interaction module, to implement function operations of the remote control.

8. The remote control for implementing image processing according to claim 7, wherein the function operations of the remote control comprise power-on/power-off, sleep, wake-up, power statistics collection, power warning and a battery charging prompt.

9. The remote control for implementing image processing according to claim 6, further comprising a power management module, connected to the remote-control control module and the image processing module, and configured to supply power to the remote-control control module and the image processing module.

10. The remote control for implementing image processing according to claim 9, wherein the power management module comprises an image processing module-starting module and an image processing module-analog control module.

11. An unmanned aircraft system, comprising an aerial vehicle, and further comprising a remote control for implementing image processing comprising a remote control controller, an image transmission unit and a data transmission unit, and further comprising:
    a system processor, connected to the remote control controller and the image transmission unit, and configured to process an image transmitted by the image transmission unit; and a display unit, connected to the system processor, and configured to edit the image processed by the system processor, wherein the remote control controller exchanges system data with the system processor, to implement function operations of the remote control, and the image transmission unit sends image data obtained from an unmanned aerial vehicle to the system processor, to edit the image data on the display unit connected to the system processor, wherein the remote control for implementing image processing is wirelessly connected to the aerial vehicle, and wherein the remote control receives operation data and image data that are sent by the aerial vehicle, and the display unit connected to the system processor edits the image data.

12. An unmanned aircraft system, comprising an aerial vehicle, and further comprising a remote control for implementing image processing comprising a remote control controller, an image transmission unit and a data transmission unit, and further comprising:
   a system processor, connected to the remote control controller and the image transmission unit, and configured to process an image transmitted by the image transmission unit; and
   a display unit, connected to the system processor, and configured to edit the image processed by the system processor, wherein
   the remote control controller exchanges system data with the system processor, to implement function operations of the remote control, and the image transmission unit sends image data obtained from an unmanned aerial vehicle to the system processor, to edit the image data on the display unit connected to the system processor, wherein the remote control for implementing image processing is wirelessly connected to the aerial vehicle and wherein the remote control receives operation data and image data that are sent by the aerial vehicle, and the display unit connected to an image processing module edits the image data.

13. An image processing method for an unmanned aerial vehicle, comprising the following steps:
   obtaining, by a remote-control control module, image data sent by the unmanned aerial vehicle;
   sending, by the remote-control control module by using a first image transmission interaction module, the image data obtained from the unmanned aerial vehicle to a second image transmission interaction module; and
   editing, by a display module connected to an image processing module, the image data received by the second image transmission interaction module.

14. The image processing method for an unmanned aerial vehicle according to claim 13, wherein the remote-control control module comprises a first system interaction module, the image processing module comprises a second system interaction module, and the first system interaction module exchanges system data with the second system interaction module, to implement function operations of a remote control.

15. The image processing method for an unmanned aerial vehicle according to claim 13, wherein a power management module centrally manages the remote-control control module and the image processing module, to supply power to the remote-control control module and the image processing module.

16. A computer storage medium, wherein the computer storage medium can store a program, and the program performs the following steps:
   obtaining, by a remote-control control module, image data sent by the unmanned aerial vehicle;
   sending, by the remote-control control module by using a first image transmission interaction module, the image data obtained from the unmanned aerial vehicle to a second image transmission interaction module; and
   editing, by a display module connected to an image processing module, the image data received by the second image transmission interaction module.

\* \* \* \* \*